Oct. 7, 1969  H. L. PETERS ET AL  3,471,391
CHLORINE GAS LEAK DETECTOR
Filed Nov 30, 1965  2 Sheets-Sheet 2

INVENTORS
HARRY L. PETERS
DAVID J. NESSIM
BY JAMES J. MORROW
GARRET H. HILTON, JR.
ATTORNEY

3,471,391
CHLORINE GAS LEAK DETECTOR

Harry L. Peters, Ambler, David J. Nessim, Warminster, James J. Morrow, Norristown, and Garrett H. Hilton, Jr., Hatboro, Pa., assignors to Fischer & Porter Co., Warminster, Pa., a corporation of Pennsylvania
Filed Nov. 30, 1965, Ser. No. 510,643
Int. Cl. B01k 3/00; C22d 1/02
U.S. Cl. 204—195                                                    12 Claims

ABSTRACT OF THE DISCLOSURE

A system for sensing the concentration of chlorine contained in the atmosphere. The system comprises an analyzer cell having a pair of electrodes across which a constant potential is impressed, the electrodes being partly immersed in buffered water, as a result of which the overall resistance of the cell is high. A moving stream of atmospheric gas to be analyzed is directed at the surface of the water in the gap between the electrodes to produce a reaction only when chlorine is present in the gas. The reaction is reflected in a reduction in cell resistance to produce a current flow whose intensity depends on the concentration of chlorine.

---

This invention relates generally to gas analysis, and more particularly to a detector for sensing chlorine gas in air and for quantitatively determining the amount thereof or for qualitatively indicating its presence.

In modern water supply and in sewage treatment and industrial waste systems, chlorination is the most effective hygienic measure thus far devised, for even in relatively small concentrations it destroys large numbers of pathogenic bacteria, protozoa and viruses. While highly beneficial as a hygienic agent, chlorine is dangerous as a free gas. Serious injury may be caused by as little as 40 to 60 parts per million of chlorine in air inhaled for thirty minutes or more.

Chlorine gas has a characteristic odor which is penetrating and highly irritating. Hence when a chlorine leak occurs at an installation provided with chlorination equipment and having personnel on continuous duty, the leak will be detected almost instantly. But at an unattended chlorination station, considerable damage to property or even loss of life may take place before a leak is discovered and repaired. As noted in the "Chlorine Manual" published by The Chlorine Institute, Inc., "Chlorine leaks never get better. Chlorine leaks always get worse if they are not corrected promptly." It is vital, therefore, that detection apparatus be provided in conjunction with apparatus using chlorine to indicate the presence of abnormal chlorine concentrations in the air.

One known form of detector for indicating the presence of chlorine is the electro-conductivity analyzer of the water ionization type, which is an instrument adapted for the continuous measurement of atmospheric or process concentrations of contaminants, such as sulphur dioxide, chlorine, hydrogen sulphide, and other gases or vapors that will ionize in water, either directly or after decomposition or oxidation. In an instrument of this type, the conductivity of water is measured by a set of electrodes connected in an A–C conductivity circuit.

The analysis is carried out in an analyzing cell into which the gas sample and a deionized water stream are individually metered at a constant rate. The deionized water flows past a pair of water check electrodes and then goes into a mixing chamber where it is intermingled with the entering gas. After the gas sample and water are mixed, the water containing the resultant dissolved ions passes between the active electrodes to produce a current in the A–C circuit which reflects the conductivity of the water and is a function, therefore, of the amount of gas dissolved therein.

The electro-conductivity analyzer has a number of serious drawbacks, particularly with reference to the detection of chlorine. To begin with, the analyzer is not only sensitive to chlorine, but other gases ionizable in water will produce the same effect with misleading results if the analyzer is used as an alarm to indicate abnormal concentration of chlorine in the atmosphere. Moreover, air locks occurring in the flow passages will give rise to erroneous signals. The need for a water deionization chamber is also a source of practical difficulty, for such chambers require periodic replacement. Furthermore, because of the process involved, the instrument is relatively complex and expensive.

In view of the foregoing, it is the primary object of this invention to provide an efficient and highly sensitive detector adapted to quickly sense chlorine gas in air and for qualitatively indicating its presence or for measuring the concentration thereof.

A significant feature of the invention resides in the fact that the detector is unaffected by those gases other than chlorine normally encountered in an environment where chlorine is likely to be detected. Thus the instrument is insensitive to cigarette or match smoke, as well as to the human breath, whereas the water-ionization type will respond to such gases.

More specifically, it is an object of the invention to provide an analyzer cell wherein a pair of electrodes across which a constant potential is impressed, are partly immersed in buffered water, as a result of which the electrodes are polarized or passivated and this overall resistance of the cell is therefore high. A moving stream of gas to be analyzed is directed at the surface of the water in the gap between the electrodes, whereby when chlorine is present hypochlorous acid is reduced at the negative electrode, while reversible oxidation transpires at the positive electrode, the chemical reaction at the polarized layer of each electrode effecting depolarization thereof and resulting in a measurable reduction in overall cell resistance which is a function of the chlorine concentration in the air.

An important aspect of the invention lies in the fact that inasmuch as the chemical reaction occurs on the surface of the fluid between the electrodes in the cell, the response of the analyzer thereto takes place in a matter of seconds, both with the removal or addition of chlorine gas.

Also an object of the invention is to provide an additive for the buffered water in an analyzer of the above type, which not only sharply increases the sensitivity of the cell, but also prevents contamination of the electrodes in the course of operation, whereby the system remains operative for prolonged periods without maintenance.

Yet another object of the invention is to provide a gas analyzer of the above type, which is adapted to set off a "danger" alarm signal when the gas concentration exceeds a safe value, and to set off a "dead" alarm signal when the analyzer is inoperative by reason of a defective electrical circuit, or for any other reason.

Still another object of the invention is to provide a buffered supply arrangement for an analyzer cell of the above type which maintains constant the level of water between the electrodes regardless of evaporation.

Briefly stated, these objects are accomplished in a chlorine gas analyzer in which the gas to be analyzed is fed at a constant flow rate into an analyzer cell constituted by a pair of spaced electrodes almost entirely immersed in an electrolyte constituted by buffered water, preferably having potassium bromide added thereto, the incoming gas impinging on the surface of the electrolyte in the gap between the electrodes. A constant direct-voltage supply is connected across the electrodes in series with a microammeter whereby the electrodes become polarized. At the proper impressed voltage, when chlorine is present, hypochlorous acid is reduced at the negative electrode and reversible oxidation occurs at the positive electrode thereby depolarizing the electrodes, and causing a current flow through the microammeter to provide an indication which depends on the gas concentration. Means are provided to actuate a "danger" signal when the reading exceeds a safe value, and to actuate a "dead" signal when the reading falls below the value normally attained in the absence of chlorine.

For a better understanding of the invention, as well as other objects and further features thereof, reference is made to the following detailed description to be read in conjunction with the accompanying drawing, wherein:

FIG. 1 schematically shows a gas analyzer system in accordance with the invention;

Figure 6:
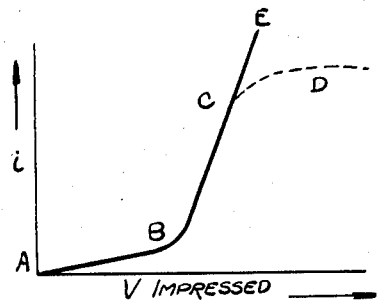
Figure 2:
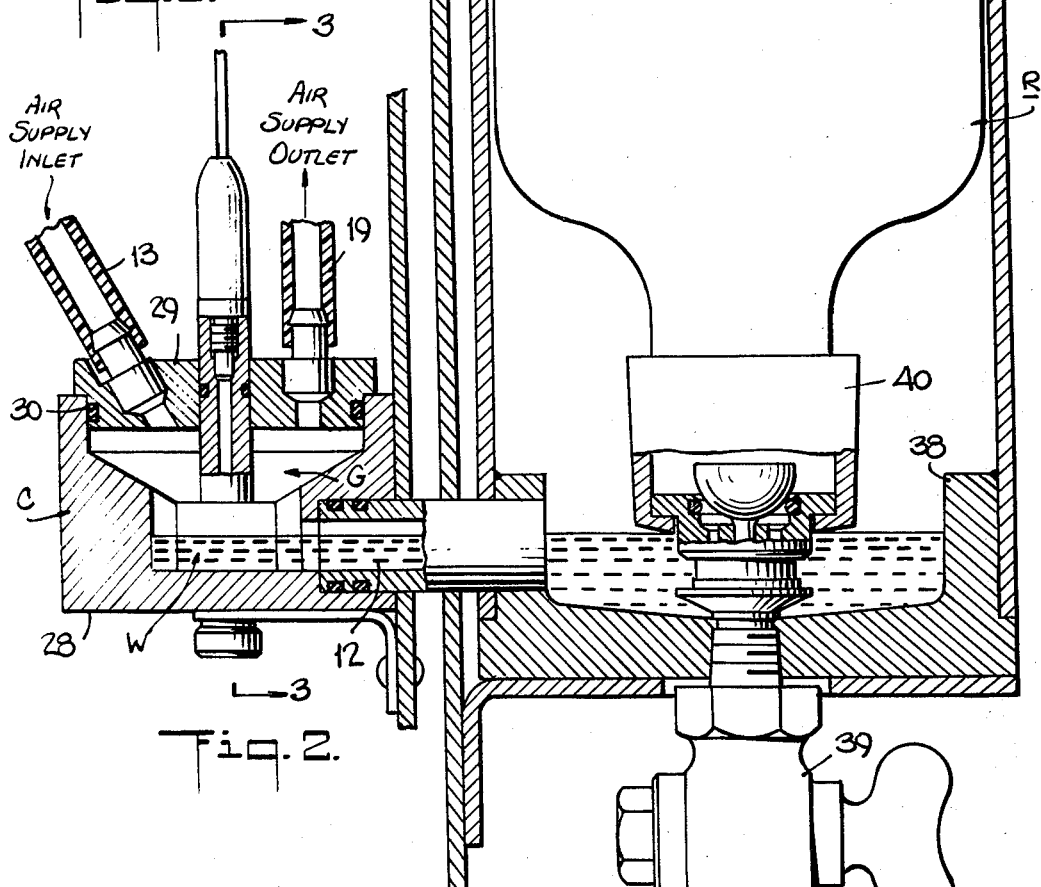
Figure 7:
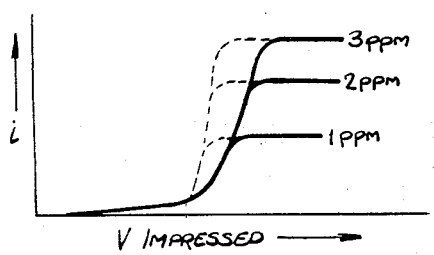

FIG. 5 graphically shows the curve developed by the relationship between gas concentration and current flow in the analyzer cell;

FIG. 6 is a graph explanatory of the action of cell in the presence of chlorine gas; and FIG. 7 is a graph explanatory of the cell action when diffusion-controlled.

General description of gas-leak detector system

Figure 1:
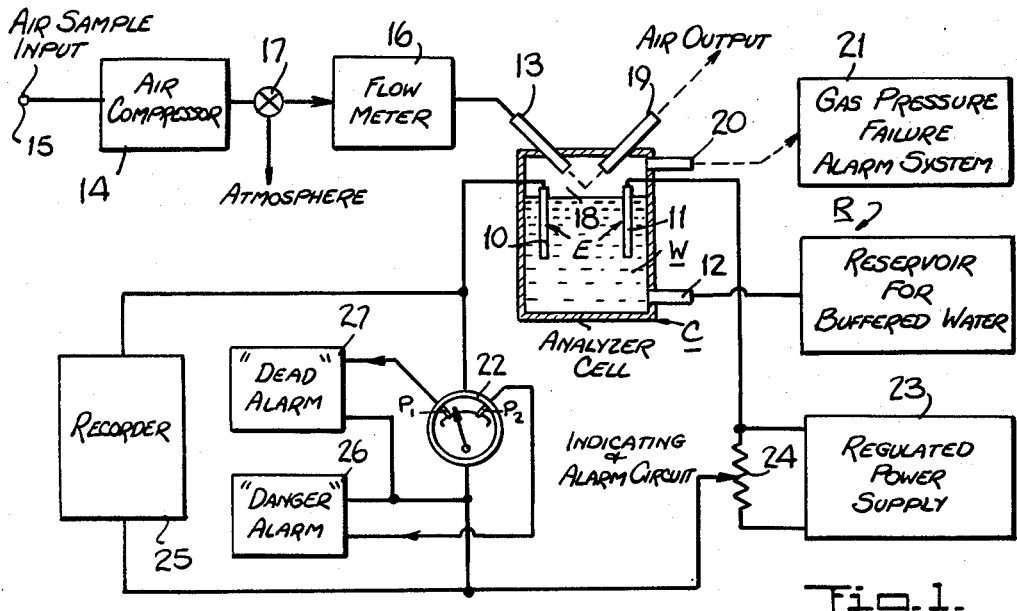

Referring now to FIG. 1, which schematically illustrates a gas-leak detector system in accordance with the invention, the system comprises an analyzing cell, generally designated by letter C, having a water chamber W, a gas chamber G, and an electrode assembly E including a pair of spaced electrodes 10 and 11.

The water chamber W is filled with buffered water which is supplied thereto through a passage 12 connected to a supply reservoir R. The level of the water in the chamber is maintained constant and is such as to partially immerse the electrodes within the gap, only the upper edges of the electrodes being exposed. For satisfactory operation of the instrument, the pH of the water should be within the limits of pH 3.5 to pH 10, the pH values of the water being adjusted by the addition of sodium acetate-acetic acid or any other suitable buffer solution. In practice, good results are obtained with a pH 4 buffered water, although other values may be used. Added to the water for reasons to be later explained, is a relatively small amount of potassium bromide (i.e., 1%).

Air containing the gas to be analyzed is fed to the gas chamber G through a nozzle 13 by means of a motor-driven compressor 14 whose input is coupled by an inlet 15 to the gas environment, the flow rate of gas being indicated by a suitable flowmeter 16. A diverting valve 17 is interposed between the flowmeter and the compressor, the compressor having excess capacity whereby gas exceeding the desired amount, is diverted to the atmosphere.

Nozzle 13 is arranged to cause the air to impinge on the surface of the buffered water in the gap 18 between the electrodes. The air and moisture evaporated from the surface of the fluid in gap 18 escapes through an outlet tube 19 coupled to gas chamber G. A tube 20 also communicates with gas chamber G and is coupled to a pressure sensor switch and alarm 21 which produces a warning signal if the air pressure within the chamber fails for any reason. Alternatively, the pressure may be sensed in the flowmeter line rather than in the analyzer cell.

It is important that the flow rate of the sampled air introduced into the chamber be maintained constant. In one parctical embodiment of the invention, air was fed into the chamber at 4250 cc. per minute through a one-quarter or $5/16$ inch (ID) tubing. While this flow rate was found to be optimum with respect to a specific embodiment, it will be appreciated that optimum air velocity and volume conditions for an analyzer will depend on electrode geometry and other parameters, which vary in different analyzer constructions.

Because of the forced air flow over the surface of the water, evaporation takes place, the resultant vapor being discharged through the outlet 19. It is necessary, therefore, to replenish the water at a rate compensating for the loss thereof. This may be accomplished in various ways. For example, reservoir R may take the form of an auxiliary constant head vessel which may be connected by passage 12 to the water chamber W. Alternatively, a very low-flow pump may be used to cause a small overflow of the liquid at the top of the electrodes, or a so-called "chicken feeder" may be used to feed in water at a rate equal to the loss rate.

Electrodes 10 and 11 are connected through a microammeter 22 to a source of direct voltage 23, which may be a regulated power supply or a mercury battery of a type providing a constant output for substantially the full life thereof. A potentiometer 24 is shunted across the voltage source, whereby the direct voltage applied across electrodes 10 and 11 may be adjusted to a desired value.

In order to prevent disassociation of the water, the voltage level must be kept very low. In practice, the voltage impressed across the electrodes may be adjusted by the potentiometer to a value lying in the range of 0.2 to 2.0 volts, the choice of voltage depending on the point at which maximum sensitivity is obtained.

The current flow through the cell essentially depends on the electrode geometry, the impressed voltage, and the reaction taking place at the electrodes as the gas strikes the surface of the water. Hence the arrangement is made such that there is a constant flow of gas impinging on the surface of the water in the gap, the pH of the water is constant, the level of the water in the gap is constant, and the voltage impressed across the electrodes is constant. The only parameter which is variable, is the gas concentration in the inflowing air.

As long as no chlorine is present in the air, only an extremely small current will pass between the electrodes. But as soon as chlorine appears, even as small a quantity as 1 p.p.m. by volume, the current begins to increase. After the time required for the water reaction, the current will level out at a value that is a function of its concentration. The successive values from which the curve in FIG. 5 is plotted, are those established for different gas concentrations after leveling out has taken place.

As shown by this curve, there exists a functional relationship between gas concentration indicated in terms of parts per million by volume, and current, indicated in milliamperes. Inasmuch as the threshold of human smell is 3 p.p.m., it will be appreciated that the gas analyzer in accordance with the invention is extremely sensitive, and will give notice of the presence of gas even before the gas can be smelled.

To provide a permanent record of changes in gas concentration which occur over an extended period of time, a moving-chart recorder 25 may be connected across the microammeter 22, the stylus of the recorder being responsive to the carrying current to produce a trace across a chart moving at a constant velocity.

The reading of the microammeter 22 indicates the concentration of chlorine in the atmosphere and when this reading exceeds a given value, the concentration lies in the danger zone and an alarm must be given. This function can be carried out by the use of a controller type of microammeter having adjustable control points, such as points $P_1$ and $P_2$, which are actuated when the meter needle passes these points. Point $P_2$ is set at the leading edge of the danger zone, and is connected to a suitable alarm circuit 26. The same result may be accomplished in other ways, as for example, by the use of a sensitive relay in the electrode circuit, the relay being actuated when the current therethrough reaches an amplitude indicative of an excessive or hazardous concentration of gas, the actuation of the relay closing an alarm circuit.

It is also desirable to indicate a "dead" condition, such as a drop in the voltage supply, a fall in the level of water in the cell, or any other condition such as an interruption of sample air flow, resulting in a reduction of current flow in the electrode circuit below its normal value, that is, the value of current obtained in the absence of chlorine. This can be accomplished by setting point $P_2$ in the microammeter so as to be actuated when the current flow falls below the normal value, point $P_1$ being connected to a suitable "dead" alarm 27. The "dead" and "danger" alarms can be distinguished from each other in terms of light, color, or the character of the sound produced, or by blinker lights. In practice, the alarms may be at a remote point to provide a warning of an excessive concentration of gas at the chlorination station, or the failure of the analyzer system.

The calibration of the microammeter is effected by exposing the system to a known concentration of chlorine in air. This is done by metering a known air flow to the analyzer and adding chlorine gas to the air flow from a motor-driven syringe.

Structure of analyzer cell and water supply

Figures 2, 3, 4:
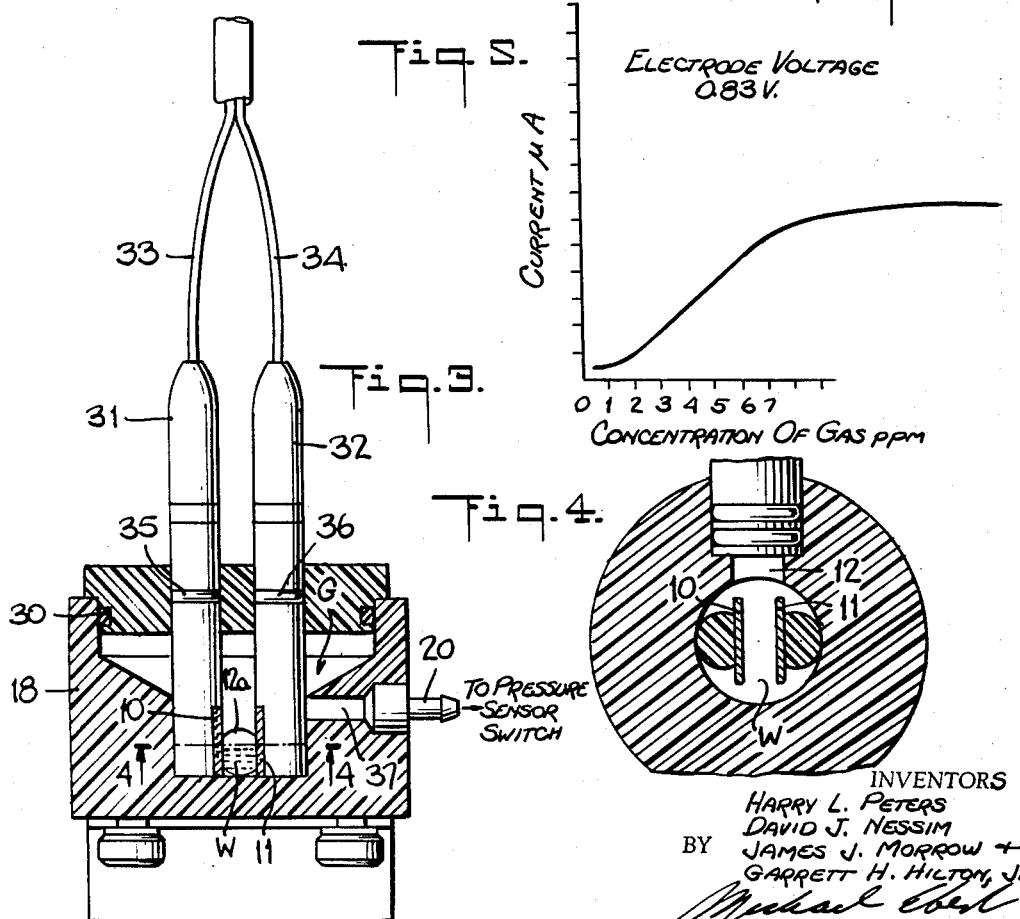
FIG. 2 is an elevational view, partly in section, of the structure of an analyzer cell and water reservoir assembly.
FIG. 3 is a longitudinal section taken through the cell in the plane indicated by line 3—3 in FIG. 2.
FIG. 4 is a transverse section taken in the plane indicated by line 4—4 in FIG. 3.

As shown in FIGS. 2 and 3, the analyzer cell C in accordance with the invention is constituted by a cylindrical vessel 28 formed of electrically insulating material, such as glass, synthetic resin, acrylic having suitable dielectric properties. Formed within the vessel is a cylindrical well constituting the water chamber W into which the electrode assembly is inserted, the well communicating with a conically-shaped gas chamber G.

The vessel 28 is enclosed by a disc-shaped cover 29 formed of insulating material, such as polyvinylchloride, and provided with a sealing ring 30 which engages the inner wall of the vessel. Supported on the cover are the air inlet coupling 13 and the air output coupling 19, as well as a pair of vertical insulating tubes 31 and 32 which extend through the cover and project into well W, the ends of the tubes abutting the floor of the well.

Electrodes 10 and 11 are mounted at the ends of the tubes, the electrodes being connected to lead wires 33 and 34 passing through the tubes, the wires being connected in the microammeter circuit shown in FIG. 1. The cover is removable from the vessel, and the tubes are removable from the cover, the tubes being provided with sealing rings 35 and 36. Vessel 28 includes a lateral passage 37 communicating with the outlet 20 for coupling the gas-pressure failure alarm system 21, as shown in FIGURE 1.

Electrodes 10 and 11 are formed of a noble metal such as platinum or gold, the electrodes being essentially flat and rectangular. In practice, the electrode area may be ¾" in length (horizontal) and ½" in height (vertical), with a thickness of .005". These dimensions are not critical, and the invention is operable with larger or smaller electrode areas. The invention is, however, not limited to flat electrodes and other configurations may be used.

Reservoir R, in the embodiment shown, takes the form of a bottle of distilled water inverted over an open pool structure 38 provided with a drain valve 39 to permit cleaning of the system. The mouth of the bottle is provided with an outlet stopper 41. The pool communicates with the water chamber W, in the analyzer cell through duct 12. As shown in FIG. 3, the water level in the pool is such that the surface of the water in chamber W exposes the upper portions of electrodes 10 and 11, for the electrodes are only partially immersed.

It is important to note that in the arrangement shown, the passage 12 has an outlet 12a in the water chamber W, the passage between the pool and the desired level of the water in the gap between the electrodes being at the same geographical level, wherby the level of the water is always maintained. It must be borne in mind that the buffered solution increases in concentration with time as the water evaporates, thus giving rise to an increase in specific gravity. But because of the arrangement disclosed, this increase in specific gravity will not cause a fall in the level of the water between the electrodes.

Operation of cell structure

The distilled water used in the analyzer is, as has been explained previously, buffered. With a proper direct voltage impressed across the electrodes, when chlorine is present, hypochlorous acid will be reduced at the negative electrode, with reversible oxidation occurring at the positive electrode. This reaction occurs at the surface of the fluid between the electrodes, and it is essential, therefore, that the electrodes not be completely covered.

As presently understood, the theory underlying the invention is as follows: Let us first, with reference to FIG. 5, consider what is observed when the current in the analyzer cell is followed as a function of impressed voltage in the presence of chlorine. As voltage V is increased from values A to B, only a small current ($i$) results, this being largely capacitive in nature by reason of positive ions migrating to the negative electrode and negative ions to the positive electrode. At value B, sufficient potential is available for electrolysis to occur. Bromine is reduced at the negative electrode with corresponding oxidation resulting at the positive electrode. With a further increase in voltage, the current may take the path BCE or BCD, depending on whether the electrode processes are diffusion controlled (the BCD path) or not. The slope of line BC is inversely equivalent to the cell's resistance.

If the process is diffusion controlled, curves such as shown in FIG. 7 will result for different amounts of chlorine gas (1 p.p.m., 2 p.p.m., and 3 p.p.m.). For a different cell resistance, the dashed-line curves might result, but the magnitude of current ($i$) will be the same for equivalent amounts of chlorine. Strictly speaking, current is proportional to a wide range of gas concentrations only if the electrode processes are diffusion controlled. But in most practical applications where the detector is intended only to detect leaks, some linearity is necessary only over a small range of concentrations, and a diffusion controlled process is not necessary.

It has been found that the addition of a small amount of potassium bromide permits the cell to operate for prolonged periods without contamination. When chlorine dissolves in the electrolyte, a thin layer of HOCL is produced, causing a film to be formed at the measuring electrode whose thickness increases with time, causing a decay in signal output. But when potassium bromide is added to the electrolyte, $Br_2$ is formed and measured in the absence of a masking film, the reaction being as follows:

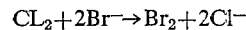
$$CL_2 + 2Br^- \rightarrow Br_2 + 2Cl^-$$

Moreover, the addition of the potassium bromide has been found to enhance the sensitivity of the cell by a factor of 5. This increase in sensitivity is believed to result from the facility of the oxidizing agent ($Br_2$) to undergo simultaneous oxidation and reduction at a particular applied potential.

While there has been shown and described a preferred embodiment of chlorine gas detector in accordance with the invention, it is to be understood that many changes and modifications may be made therein without departing from the essential spirit of the invention as defined in the annexed claims.

What we claim is:

1. A detecting system for sensing the concentration of chlorine contained in the atmosphere, said system comprising:
   (A) an analyzer cell including,
      (a) a fluid chamber for containing an electrolyte constituted by buffered water,
      (b) a gas chamber above the surface of said electrolyte,
      (c) a pair of electrodes of the same material partially immersed in said electrolyte in the fluid chamber to define an air gap at the surface of said electrolyte wherein a portion of said electrodes is exposed, and
      (d) means to feed gas from said atmosphere at a controlled rate into said gas chamber, the gas being directed at the surface of the water in the gap between said electrodes to produce a reaction only when chlorine is present in the gas, and
   (B) a detector circuit coupled to said cell and including
      (a) a direct voltage source to impress a voltage across said electrodes having a potential at which the current flow through said cell depends on the concentration of chlorine in the gas fed into said gas chamber, and
      (b) means to indicate the intensity of said current flow.

2. A system as set forth in claim 1, further including means to maintain the level of said electrolyte constant.

3. A system as set forth in claim 1, wherein said electrolyte has a pH in the range of 3.5 to 10.

4. A system as set forth in claim 1, wherein said voltage lies in the range of 0.2 to 2.0 volts.

5. A system as set forth in claim 1, wherein said gas is fed into said gas chamber through a diverting valve and a compressor having an excess capacity to maintain said flow at a constant rate.

6. A system as set forth in claim 1, wherein said buffered water contains a relatively small amount of potassium bromide.

7. A system as set forth in claim 1, further including a danger alarm and means to actuate said alarm when the intensity of circuit flow exceeds a safe value.

8. A system as set forth in claim 1, further including a "dead" alarm and means to actuate said alarm when the intensity of current flow falls below the normal value obtained in the absence of chlorine.

9. A system as set forth in claim 1, further including means responsive to gas pressure in said gas chamber to indicate the loss of pressure.

10. In a detecting system for sensing the concentration of chlorine contained in the atmosphere, an analyzing cell comprising:
    (a) a vessel having a well for containing an electrolyte constituted by buffered water to form a fluid chamber, and a gas chamber disposed above said fluid chamber, said vessel having a lateral passage to admit said electrolyte into said well and to maintain a constant level thereof,
    (b) a removable cover for said vessel,
    (c) an air supply coupling embedded in said cover to feed gas from said atmosphere into said gas chamber,
    (d) an air outlet coupling embedded in said cover to discharge gas from said gas chamber, and
    (e) a pair of insulating tubes extending through said cover into said well, said tubes having a pair of electrodes mounted at the lower ends thereof and partially immersed in said electrolyte to define an air gap at the surface of said electrolyte, and leads from said electrodes passing through said tubes.

11. A cell as set forth in claim 10, wherein said electrodes are formed of platinum.

12. In a gas-leak detecting system as set forth in claim 10, further including a reservoir for supplying electrolyte to said cell and including a bottle of water inverted in a pool structure having a passage communicating with the passage leading to said well.

References Cited

UNITED STATES PATENTS

| | | | |
|---|---|---|---|
| 1,320,036 | 10/1919 | Crockatt | 204—195 |
| 1,632,285 | 6/1927 | Georgi | 204—278 |
| 1,913,429 | 6/1933 | Crawford | 204—277 |
| 2,278,248 | 3/1942 | Darrah | 204—195 |
| 2,651,612 | 9/1953 | Haller | 204—195 |
| 2,728,121 | 12/1955 | Goument | 204—278 |
| 3,330,755 | 7/1967 | Mahany | 204—229 |

JOHN H. MACK, Primary Examiner

T. H. TUNG, Assistant Examiner

U.S. Cl. X.R.

204—229, 277, 278